United States Patent
David et al.

(10) Patent No.: US 9,719,398 B2
(45) Date of Patent: Aug. 1, 2017

(54) METHOD OF DETERMINING THE THERMAL STATE OF A SUBSTANCE IN COLD CONDITION

(71) Applicant: GM GLOBAL TECHNOLOGY OPERATIONS LLC, Detroit, MI (US)

(72) Inventors: Giovanni David, Torino (DE); Igor Zanetti, Verrayes (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 580 days.

(21) Appl. No.: 14/332,069

(22) Filed: Jul. 15, 2014

(65) Prior Publication Data

US 2015/0016485 A1 Jan. 15, 2015

(30) Foreign Application Priority Data

Jul. 15, 2013 (GB) .................................. 1312653.7

(51) Int. Cl.
| | |
|---|---|
| *G01N 25/12* | (2006.01) |
| *G01N 25/36* | (2006.01) |
| *G01N 25/46* | (2006.01) |
| *G01N 25/48* | (2006.01) |
| *G01N 25/28* | (2006.01) |
| *F01N 11/00* | (2006.01) |
| *G01K 13/00* | (2006.01) |
| *G01K 3/10* | (2006.01) |

(52) U.S. Cl.
CPC ................ *F01N 11/00* (2013.01); *G01K 3/10* (2013.01); *G01K 13/00* (2013.01); *G01K 2205/00* (2013.01); *Y02T 10/47* (2013.01)

(58) Field of Classification Search
CPC ........ G01N 25/00; G01N 25/12; G01N 25/28; G01N 25/36; G01N 25/38; G01N 25/46
USPC ........ 374/16, 28, 141, 144, 25, 102; 60/286, 60/295, 301, 272, 273
See application file for complete search history.

(56) References Cited

U.S. PATENT DOCUMENTS

| | | | |
|---|---|---|---|
| 8,671,666 B2 * | 3/2014 | Yezerets ................. | F01N 3/208 60/274 |
| 2007/0193254 A1* | 8/2007 | Johannes .............. | F01N 3/0871 60/286 |
| 2012/0006003 A1 | 1/2012 | Darr et al. | |

(Continued)

FOREIGN PATENT DOCUMENTS

| | | |
|---|---|---|
| DE | 102011106552 A1 | 1/2012 |
| WO | 2012098309 A1 | 7/2012 |

*Primary Examiner* — Gail Kaplan Verbitsky
(74) *Attorney, Agent, or Firm* — Lorenz & Kopf LLP

(57) ABSTRACT

A method of determining a thermal state or a thermal state transition of a substance based on how much liquid phase is available is disclosed. The method includes: (a) determining a current thermal state of the substance when the internal combustion engine is switched on based on a tank temperature and on a time interval during which the engine is switched off; and (b) calculating a percentage of the liquid phase in case the thermal state is a mixture of solid phase and liquid phase based on a total mass of the substance in the tank, a heat amount supplied to the tank, a heat exchange of the tank with an external environment; and (c) detecting the thermal state transitions based on said tank temperature and its time derivative and on said percentage of the liquid phase.

12 Claims, 4 Drawing Sheets

(56) References Cited

U.S. PATENT DOCUMENTS

2014/0102187 A1* 4/2014 Andreae ............. G01M 15/102
                                              73/114.71
2016/0097312 A1* 4/2016 Nilsson ................... F01N 3/22
                                              60/274
2016/0320107 A1* 11/2016 McKay .................. F25B 27/00

* cited by examiner

METHOD OF DETERMINING THE THERMAL STATE OF A SUBSTANCE IN COLD CONDITION

This application claims priority to GB Patent Application No. 1312653.7 filed Jul. 15, 2013, which is incorporated herein by reference in its entirety.

TECHNICAL FIELD

The technical field relates to a method of determining the thermal state or the thermal state transition of a substance in cold condition.

BACKGROUND

In the art are known exhaust gas treatment systems for the emissions reduction and in particular of particulates and oxides of nitrogen ($NO_X$) from the diesel engine exhaust gas. These systems are provided with after-treatment devices installed along the exhaust line of the engine. The selective catalytic reduction (SCR) system is one of the used after-treatment system for $NO_X$ control.

It is also known in the art, in some exhaust system configuration, to inject a reagent (catalyst) fluid in the exhaust line of the diesel engine in order to reduce emissions by means of the afore-mentioned after-treatment devices. In particular, a fluid catalyst such as urea, or ammonia, or a combination thereof (generally in a water solution) are injected into the exhaust line of the diesel engine in order to promote the reduction of nitrogen oxides ($NO_X$) in the SCR. The SCR system includes an additional tank into the vehicle platform containing the diesel exhaust fluid or DEF. DEF freezes in cold condition according to the liquid characteristic (for example, one of the most used, the so called Adblue, freezes at −11° C.). It is important in cold conditions to have the liquid thermal state estimation (i.e. 100% solid phase, 100% liquid phase or a mixture of solid phase and liquid phase) and to calculate also the total amount of defrosted DEF to guarantee that SCR system works in those conditions in a proper way and according to the legislative requirements.

In fact, for SCR applications, the thermal state estimation of the DEF, which is contained in the tank, is needed to better manage the SCR control in cold condition. Typically, the amount of liquid inside a frozen tank with heating function is an important parameter: in SCR systems the DEF is injected to reduce NOx emission and in cold conditions the available DEF information is needed to be sure that the system works as well as possible. Without this information, it means the system can inject all the available DEF. Consequently, the hydraulic system cannot work properly and damaging of the hardware has to be expected.

DE 102011106552 A1 discloses that if the diesel exhaust fluid is at least partially frozen, then a temporary minimum diesel exhaust fluid mass may be defined. US 20110047966 A1 discloses an apparatus for controlling the heating of diesel exhaust fluid in a DEF delivery system which includes a temperature comparison module that compares a difference between a sensed ambient air temperature and a sensed DEF tank temperature with a predetermined temperature difference threshold.

There is a need in the art to provide a method and an apparatus which estimates the thermal state or the thermal state transition of a substance, which can be a 100% solid phase or a 100% liquid phase or a mixture of solid phase and liquid phase, or in other words the substance can be totally frozen, partially frozen, or totally liquid.

SUMMARY

An embodiment of the present disclosure provides a method of determining a thermal state or a thermal state transition of a substance contained in a tank of an after-treatment system of an internal combustion. The thermal state may be a 100% solid phase or a 100% liquid phase or a mixture of solid phase and liquid phase. The method includes: determining a current thermal state of the substance when the internal combustion engine is switched on, based on a tank temperature and on a time interval during which the engine has been switched off. The latter time interval thus represents the time between the last engine stop and the new engine start. In case the thermal state is a mixture of solid phase and liquid phase, calculating a percentage of the liquid phase based on a total mass of the substance in the tank, an amount of heat supplied to the tank and a heat exchange of the tank with an external environment. The thermal state transitions are determined based on said tank temperature and its time derivative and on said percentage of the liquid phase.

Consequently, an apparatus is disclosed for determining a thermal state or a thermal state transition of a substance and, based on that, how much liquid phase is available, the apparatus including: means for determining a current thermal state of the substance when the internal combustion engine has been switched on based on a tank temperature and on a time interval during which the engine has been switched off. Means for calculating a percentage of the liquid phase in case the thermal state is a mixture of solid phase and liquid phase based on a total mass of the substance in the tank, an amount of heat supplied to the tank and a heat exchange of the tank with an external environment. Means for detecting the thermal state transitions based on said tank temperature and its time derivative and on said percentage of the liquid phase.

An advantage of these embodiments is that such method and apparatus allows a continuous monitoring of the thermal state of the substance. Moreover, information is provided about the availability of the liquid phase amount, information which is helpful in case of partially frozen liquid, in other words, in case of mixture of solid and liquid phase.

It is possible that determining a current thermal state of the substance is configured in a way that when the tank temperature is lower than a temperature threshold, the substance thermal state is 100% solid phase. An advantage of this embodiment is to provide a first criterion to initialize the method, identifying the current thermal state of the substance when the engine is switched on.

It is possible that determining a current thermal state of the substance is configured in a way that if the tank temperature is equal to said temperature threshold and the values of a time interval during which the engine has been switched off are smaller than the value of a time threshold, the thermal state of the substance is a mixture of solid phase and liquid phase. An advantage of this aspect is to provide a second criterion to initialize the method, identifying the current thermal state of the substance when the engine is switched on.

According to another embodiment of the apparatus, means for determining a current thermal state of the substance are configured in a way that when the values of the time interval during which the engine has been switched off are larger than the value of said time threshold, the thermal state of the substance is 100% liquid phase. An advantage of this aspect is to provide a third criterion to initialize the method, identifying the current thermal state of the substance when the engine is switched on. Furthermore, if the thermal state is a mixture of solid phase and liquid phase, means for calculating the percentage of the liquid phase can be operating by summing (a) the heat amount supplied to the tank my means of a heater, and (b) the heat amount supplied to the tank due to a heat exchange of the tank with the external environment, then dividing the sum for a specific latent heat, time integrating the result and dividing the integral by the total mass of the substance in the tank. One skilled in the art will understand that instead of a percentage an absolute value (e.g., in mass) a ratio of the liquid phase relative to the solid phase can be chosen instead. Furthermore, instead of a liquid heat coefficient in J/kg, similar liquid heat coefficients in e.g. J/mole could be used in a similar fashion. An advantage of this embodiment is to take into account, in calculating the percentage of the liquid phase, all the heat exchange sources and the physical characteristics of the substance.

In another embodiment, when the internal combustion engine is switched on, means for calculating an initial percentage of the liquid phase is determined by multiplying an old percentage of the liquid phase by a coefficient, which is a function of the time interval, during which the engine has been switched off, and the tank temperature. This aspect provides a way to determine the percentage of the liquid phase, whenever the engine and the ECU are switched on and the substance is a mixture of solid phase and liquid phase.

Another embodiment provides that means for detecting the thermal state transitions can be configured in a way that a thermal state transition from a mixture of solid phase and liquid phase to 100% liquid phase is identified when the percentage of the liquid phase is higher than a first percentage threshold of the liquid phase. An advantage of this embodiment is to easily detect this thermal state transition of the substance, based on a percentage threshold, which is available from the present method. Consequently, means for detecting the thermal state transitions are also configured in a way that a thermal state transition from 100% liquid phase to a mixture of solid phase and liquid phase is identified if the percentage of the liquid phase is lower than a second percentage threshold of the liquid phase. An advantage of this embodiment is to easily detect another thermal state transition of the substance, based on a further percentage threshold, which is available from the present method.

In an embodiment, means for detecting the thermal state transitions are also configured in a way that a thermal state transition from a mixture of solid phase and liquid phase to 100% solid phase is identified if the tank temperature is lower than said temperature threshold. An advantage of this embodiment is to detect a further possible thermal state transition of the substance, based on the above temperature threshold.

In another embodiment, means for detecting the thermal state transitions are also configured in a way that a thermal state transition from 100% solid phase to a mixture of solid phase and liquid phase is identified if the tank temperature is equal to said temperature threshold and a time derivative of the tank temperature is equal to zero. An advantage of this embodiment is to detect a further possible thermal state transition of the substance. In fact, when the substance fusion process will begin, its temperature (corresponding in a first approximation to the tank temperature) will be constant during the time and equal to the substance fusion temperature or, more in general, to a calibrated temperature threshold.

Other aspects of the present disclosure relates to an internal combustion engine of an automotive system, a computer program for carrying out the method and an associated computer program product.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
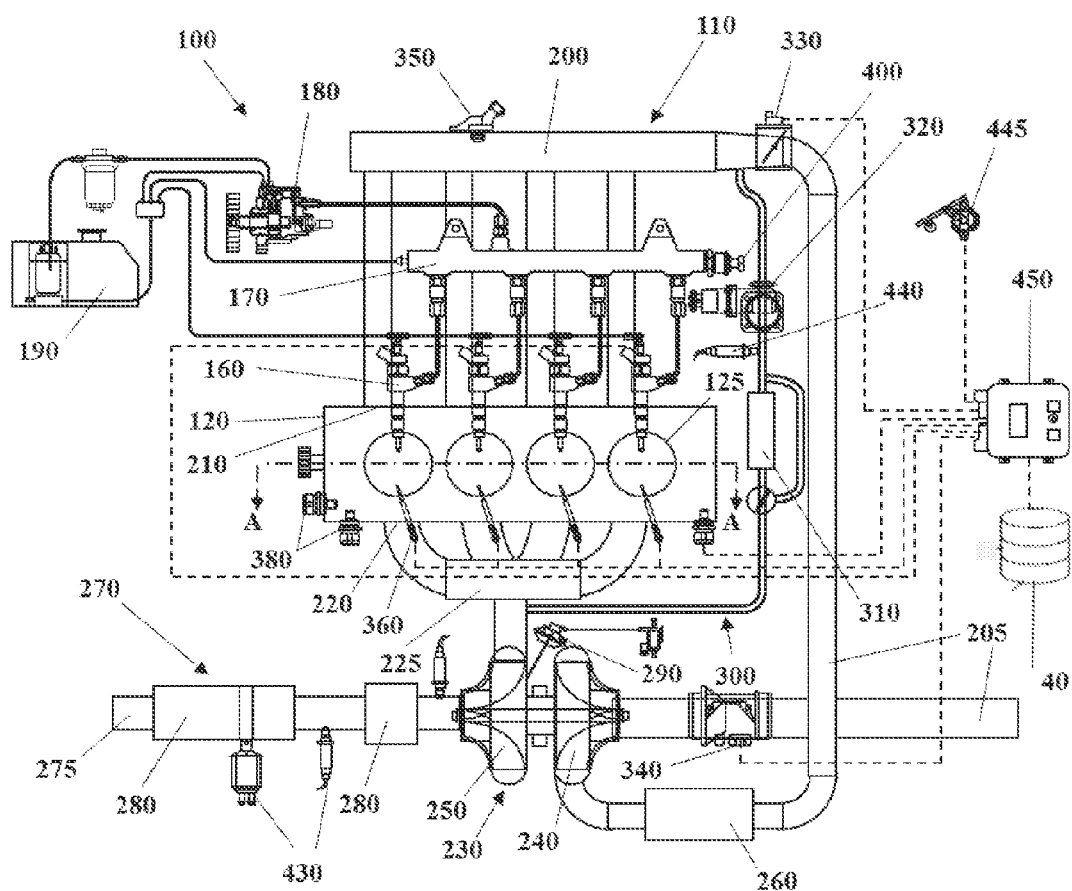
FIG. 1 shows an automotive system.
Figure 2:
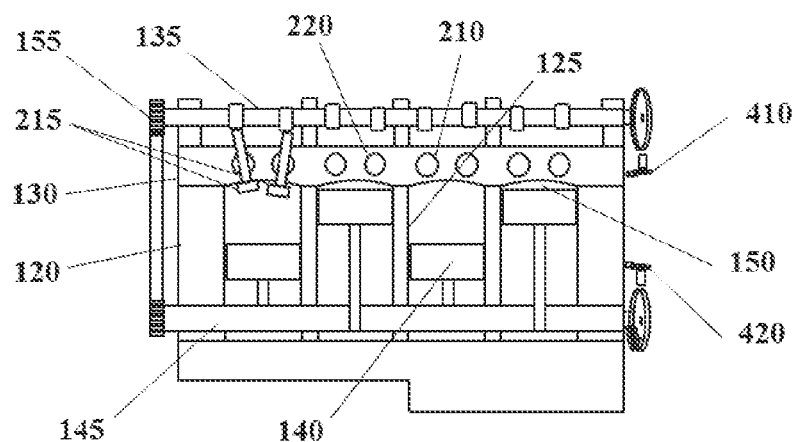
FIG. 2 is a section of an internal combustion engine belonging to the automotive system of FIG. 1.

In some embodiments of the present disclosure an automotive system 100, as shown in FIGS. 1 and 2 includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps 281, hydrocarbon adsorbers, selective catalytic reduction (SCR) systems 282, particulate filters (DPF) or a combination of the last two devices, i.e. selective catalytic reduction system including a particulate filter (SCRF) 283. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) or processor in communication with a memory system and an interface bus. The CPU is configured to execute instructions stored as a program in the memory system, and send and receive signals to and from the interface bus. The memory system may include various storage types including optical storage, magnetic storage, solid state storage, and other non-volatile memory. The interface bus may be configured to send, receive, and modulate analog and/or digital signals to and from the various sensors and control devices. The program may embody the methods disclosed herein, allowing the CPU to execute the steps of such methods for controlling the ICE 110.

The program stored in the memory system is transmitted from outside via a cable or in a wireless fashion. Outside the automotive system 100 it is normally visible as a computer program product, which is also called transient or non-transient computer readable medium or machine readable medium in the art, and which should be understood to be a computer program code residing on a carrier, the carrier preferably being either transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
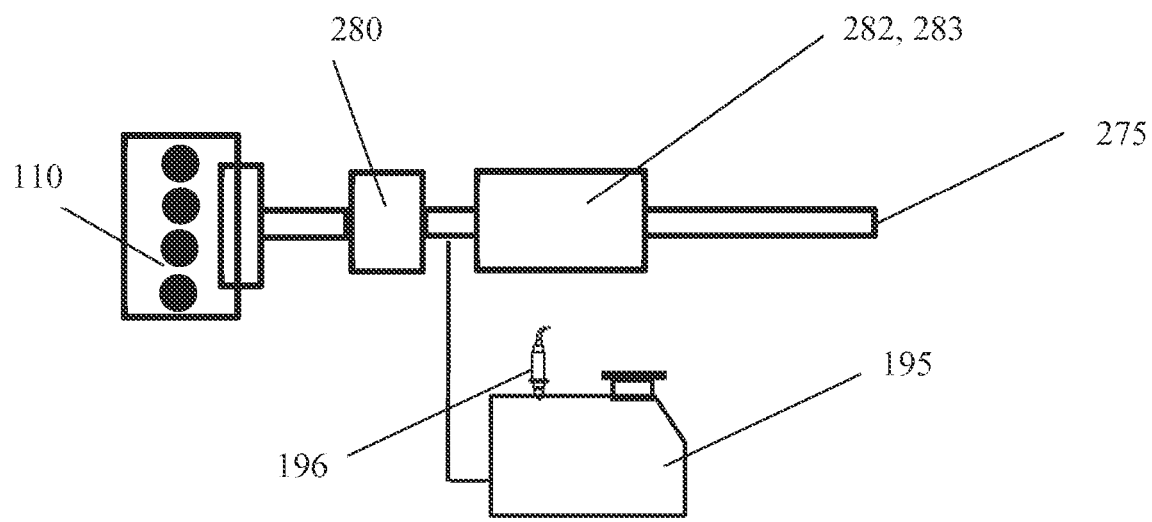
FIG. 3 is a schematic view of the after-treatment system and the tank of the diesel exhaust fuel, according to the present disclosure.

The proposed method is generally applicable to all substances, but in particular, has been thought for a diesel exhaust fuel (DEF) liquid, which is utilized by a selective catalytic reduction (SCR) systems 282 or a selective catalytic reduction system including a particulate filter (SCRF) 283. DEF is contained in a tank 195 (see FIG. 3) and from the tank is pumped through a pipeline to an injector located upstream the SCR. This fluid, normally ammonia or urea based, is then injected in the SCR and favorites the NOx reduction reactions.

The method is based on the following hypothesis: the tank 195 containing the DEF is provided with heaters (not shown) and can exchange heat with the external environment. The tank 195 has at least one tank temperature sensor 196 installed inside, to measure the temperature of the substance contained in the tank. The voltage and current supplied to the heaters are known. The DEF mass in the tank is known as well.

The estimation of the substance thermal state is based on the following two steps: a) determination of the global thermal state giving a discrete information about it, e.g. a 100% solid phase or a 100% liquid phase or a mixture of solid phase and liquid phase; b) estimation of the amount of thawed fluid into the tank 110, when the thermal state of the substance is a mixture of solid and liquid phase. The first information is mainly (but not exclusively) based on the tank temperature values. In particular, the tank temperature information is used to detect a transition state, if present. The second information depends on the first one, wherein it is trivial in case of 100% solid phase or 100% liquid phase. In fact, when the substance is totally frozen (i.e. 100% solid phase) the amount of thawed liquid is equal to zero, while when the substance appears as totally liquid (i.e. thermal state is 100% liquid phase), the amount of thawed liquid is equal to the total mass of the substance inside the tank. Instead, when the thermal state is a mixture of solid and liquid phase, the present disclosure also proposes a method to estimate the percentage of the thawed liquid.

Figure 4:
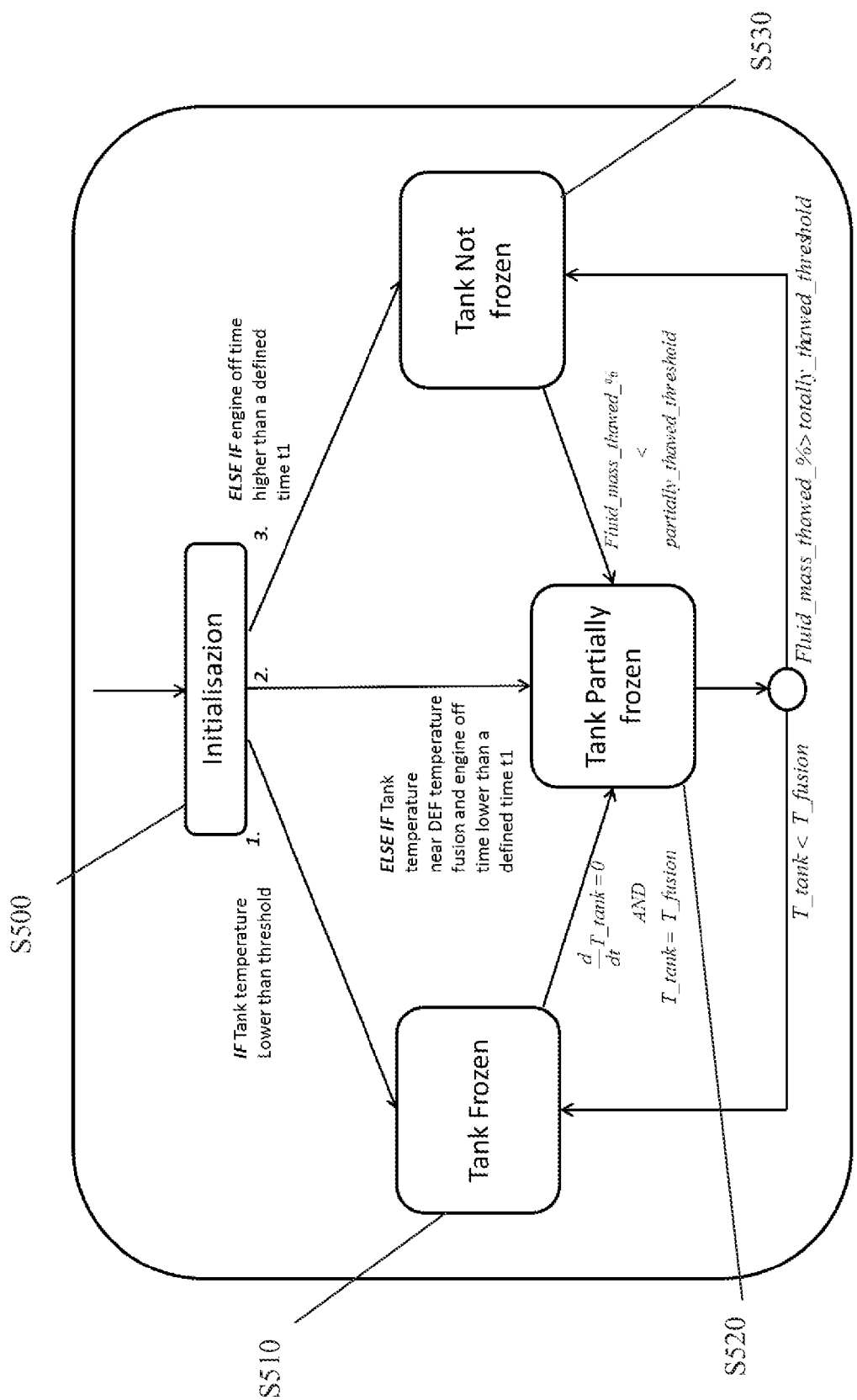
FIG. 4 is a scheme of a "state machine" depicting the present method.
Figure 5:
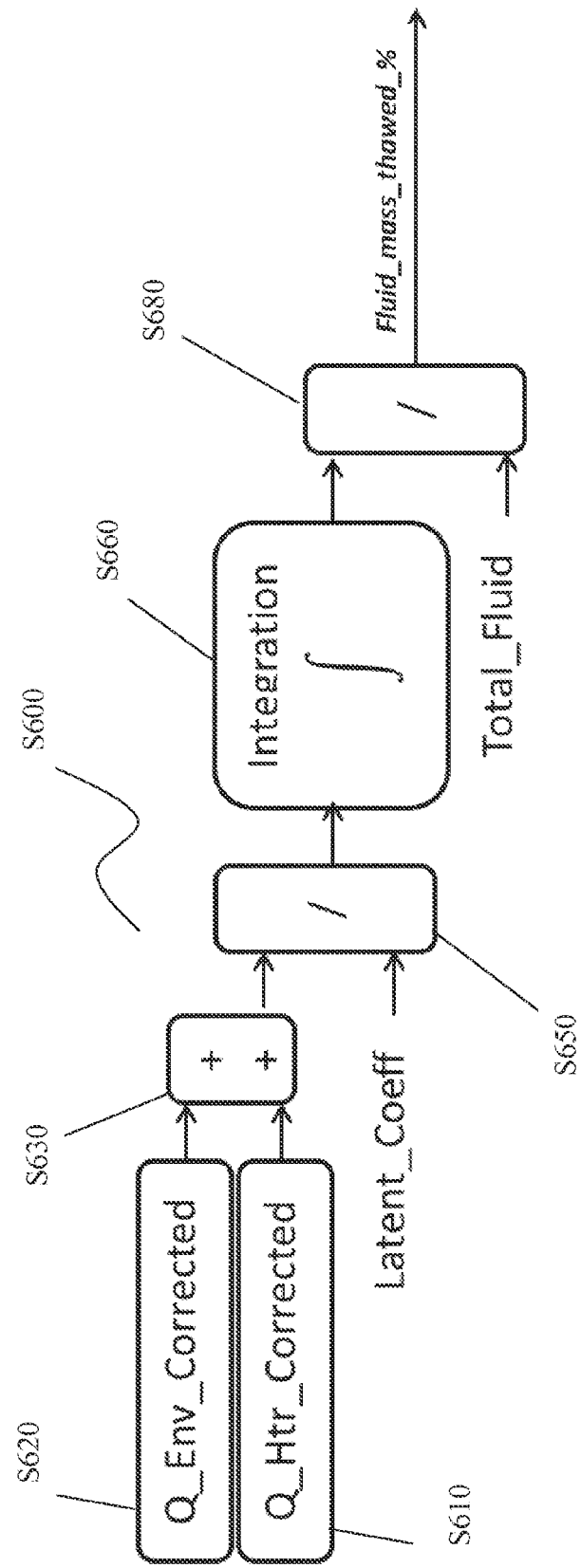
FIG. 5 is a block diagram depicting the calculation of the thawed liquid percentage, according to the present disclosure.

At first, the substance thermal state needs to be determined, whenever the engine and the electronic control unit are switched on, to identify the current thermal state. In an embodiment such current thermal state is determined (see FIG. 4) as follows: when the tank temperature T_tank is lower or equal than a fusion temperature T_fusion, the thermal state will be 100% solid phase. An advantage of this embodiment is to provide a first criterion to initialize the method, identifying the current thermal state of the substance in tank 195 when the engine 110 is switched on. In another embodiment, when the tank temperature is equal to the fusion temperature T_fusion, at least equal within a margin, for example plus or minus 3 degrees, and the time during which the engine 110 has been switched off is smaller than a predetermined time threshold $t_1$, i.e. when the time is less than $t_1$, then the thermal state will be a mixture of solid and liquid phase (i.e. the substance is partially frozen). An advantage of this embodiment is to provide a second criterion to initialize the method, identifying the current thermal state of the substance when the engine 110 is switched on.

According to a further embodiment, when the time during which the engine 110 has been switched off is larger than the time threshold $t_1$, the thermal state of the substance is 100% liquid phase. An advantage associated with this is that a third criterion is provided to initialize the method, identifying the current thermal state of the substance when the engine 110 is switched on.

In another embodiment, if the thermal state of the substance is a mixture of solid phase and liquid phase, the percentage of the liquid phase is calculated by summing: (a) the heat amount supplied to the tank 195 due to a heat exchange of the tank 195 with the external environment, and (b) heat supplied to the tank 195 by heating it with a heater, e.g. an electric heater, and dividing the sum by the specific latent heat of the substance (that is the latent heat per kg or mole). The result is time integrated, and the integral is divided by the total mass of the substance in tank 195. In this way, all the heat exchange sources and the physical characteristics of the substance are properly taken into account.

In more detail, the tank thermal exchange is modeled, considering all heat exchanges and thermal effects, to estimate the amount of defrosted liquid. At first the heater effect is calculated with the following equation:

$$Q\_Htr = V\_Sup\_Htr \cdot I\_Sup\_Htr \cdot t [J]$$

where:
Q_Htr=heater heat transfer;
V_Sup_Htr=heater supply voltage;
I_Sup_Htr=heater current; and
t=time during which the heater is turned on.

The total heat transfer is influenced by the total mass of the substance inside tank 195, therefore a corrected heat transfer is calculated as follows:

$$Q\_Htr\_Corrected = Q\_Htr \cdot K\_Htr\_Correction$$

where: Q_Htr_Corrected=corrected heat transfer provided by the heater; and
K_Htr_Correction=factor depending on the total mass of the substance in the tank.

Then the external environmental effects are considered by using the following equation:

$$Q\_Env = (T\_env - T\_tank) \cdot K\_Env\_Correction \cdot K\_VehSpd\_Correction$$

where:
T_env=temperature of the tank environment;
T_Tank=tank temperature;
Q_Env=net heat transfer to the tank when thermally coupled to the external environment;
K_Env_Correction=factor depending on the total mass of the substance in the tank; and
K_VehSpd_Correction=factor depending on the vehicle speed.

The total heat transfer Q_env to the tank is influenced by the total mass and the specific heat of the substance inside the tank, which is taken into account by a factor K_Env_Correction. Moreover, when the calculations are performed with the engine running, the total heat transfer is also influenced by the vehicle speed, because of the convective effect of the air flow under the vehicle. This additional correction is taken into account by the factor K_VehSpd_Correction.

The effective heat exchange will be given by the sum of the two contributions:

$$Q\_deltaHeat = Q\_Env + Q\_Htr\_Corrected [J]$$

where: Q_deltaHeat=effective heat exchange.

To determine the mass of the thawed liquid, also the specific latent heat of the substance will be considered. The effective heat exchange is divided by the specific latent heat and time integrated:

$$\text{Fluid\_mass\_thawed} = \int \left[ \frac{Q\_deltaHeat}{Latent\_specific \cdot 1000} \cdot 1000 \right] dt \ [g]$$

where: Fluid_mass_thawed=mass of the liquid phase; and
Latent_specific=specific latent heat.

Finally, the percentage of the liquid phase is calculated dividing the mass of the thawed liquid by the total mass of the substance in the tank, Total_Fluid:

$$\text{Fluid\_mass\_thawed\_\%} = \frac{\text{Fluid\_mass\_thawed}}{\text{Total\_Fluid}} \ [\%]$$

where: Fluid_mass_thawed_%=percentage of the liquid phase; and
Total_Fluid=total mass of the substance in the tank.

Of course, when the heaters are not activated, the only thermal effect is the environmental one. In case of external temperature very low, the substance will freeze and the thawed mass will decrease.

According to another embodiment, an initial percentage of the liquid phase Fluid_mass_thawed_init is determined. This initial percentage of the liquid phase depends on the first thermal state determination. For 100% solid phase, the initial liquid phase percentage will be zero, while for 100% liquid phase, the initial liquid phase percentage will be 100%, i.e. the liquid mass will be equal to the total mass of the substance in the tank. A further consideration is needed in case the initial state is a mixture of solid phase and liquid phase. In more detail, when the internal combustion engine 110 is switched on, this initial percentage of the liquid phase is determined by multiplying an old/prior percentage of the liquid phase Fluid_mass_thawed_old by a coefficient K_EngOffCorr, which is a function of the time interval, during which the engine 110 has been switched off, and the tank temperature. In such case the initial percentage of the liquid phase will be given by the following equation:

$$\text{Fluid\_mass\_thawed\_init} = \text{Fluid\_mass\_thawed\_old} \cdot K\_EngOffCorr$$

where, apart already known symbols:
K_EngOffCorr=coefficient, being a function of t_EngineOff and T_Tank; and
t_EngineOff=time during which the engine is switched off.

This provides a way to determine the percentage of the liquid phase, whenever the engine 110 and the ECU 450 are switched on and the substance is a mixture of solid phase and liquid phase. The correction coefficient K_EngOffCorr takes into account the time interval, during which the engine has been switched off, and the tank temperature. This dependency gives the information how much the thawed mass is changed. For example, if the vehicle has been parked for 5 hours and the actual tank temperature is equal to 0° C., this means that the thawed mass is increased.

In addition, the presented method is able to determine all thermal state transitions. There are four cases to be assessed. A first case is a thermal state transition from 100% solid phase to a mixture of solid phase and liquid phase. This is identified if the tank temperature is equal to the fusion temperature T_fusion and a time derivative of the tank temperature is equal to zero:

$$\frac{d}{dt}\text{T\_tank} = 0 \text{ AND } \text{T\_tank} = \text{T\_fusion}$$

where, apart already known symbols:

$$\frac{d}{dt}\text{T\_tank} = \text{time derivative of the tank temperature}$$

In fact, starting from 100% solid phase, if the tank temperature is increasing, as soon as it reaches the fusion temperature of the substance, the fusion process will begin and the substance temperature (i.e. the tank temperature, as a first approximation) will be constant during the time and equal to the substance fusion temperature. This condition needs to be true for a debounce time to be calibrated. Of course if the thermal state of a mixture of solid and liquid phase is recognized, the estimation of the liquid phase percentage will be performed as mentioned above.

A second case is a thermal state transition from a mixture of solid phase and liquid phase to 100% liquid phase. This can be identified if the percentage of the liquid phase is higher than a first percentage threshold (totally_thawed threshold) of the liquid phase:

$$\text{Fluid\_mass\_thawed\_\%} > \text{totally\_thawed\_threshold}$$

where, apart already known symbols:
totally_thawed_threshold=first percentage threshold of the liquid phase A third case is a thermal state transition from 100% liquid phase to a mixture of solid phase and liquid phase. This is identified if the percentage of the liquid phase is lower than a second percentage threshold (partially_thawed threshold) of the liquid phase.

$$\text{Fluid\_mass\_thawed\_\%} < \text{partially\_thawed\_threshold}$$

where, apart already known symbols:
partially_thawed_threshold=second percentage threshold of the liquid phase The first and the second percentage threshold of the liquid phase can preferably be equal to 100%.

Finally, a fourth thermal state transition is from a mixture of solid and liquid phase to 100% solid phase. This thermal state transition is identified if the tank temperature is lower than the fusion temperature T_fusion. An advantage of this embodiment is to detect a further possible thermal state transition of the substance. In fact, when the substance fusion process will begin, its temperature (corresponding in a first approximation to the tank temperature) will be constant during the time and equal to the substance fusion temperature or, more in general, to a calibrated temperature threshold.

In more detail, the following equation can be used:

$$\text{T\_tank} < \text{T\_fusion}$$

This condition needs to be true for a debounce time to be calibrated.

Another aspect of the present disclosure relates to an internal combustion engine 110 of an automotive system 100, the internal combustion engine 110 being provided with a selective catalytic reduction system 282 which may include a particulate filter, the automotive system 100 including an electronic control unit (ECU) 450 configured for carrying out the above method according to one of its embodiments.

The method according to one of its aspects can be carried out with the help of a computer program including a program-code for carrying out all the steps of the method described above, and in the form of computer program product including the computer program.

The computer program product can be embedded in a microprocessor-based control apparatus for an internal combustion engine 110, e.g. an Electronic Control Unit (ECU) 450, a data carrier associated with the ECU, and the computer program stored in a data carrier. In this case, when the control apparatus executes the computer program all the steps of the method described above are carried out.

Summarizing, the proposed method allows having a good criterion to estimate the thermal state or the thermal state transition of a tank containing a substance. The information provided is a discrete state (i.e. 100% solid phase, 100% liquid phase or a mixture of solid phase and liquid phase) but also the percentage of the thawed liquid, if existing. This method can be used in SCR system applications also to legislative requirements. In fact, legal requirements for cold conditions impose that a SCR system is able to work (it has to be intended that the system must be able to perform DEF injections) in a defined time, by using a defrost strategy to thaw the minimum amount of DEF needed to fill the DEF pump and the line up to the injector. The information of the thawed mass is used to limit the DEF injected quantity into the exhaust gas in cold condition. In fact, the DEF injected quantity cannot exceed the thawed one, to avoid a cavity formation inside the tank which would result in poor defrost capability and unavailability of fluid to be injected for cooling purposes.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for determining a thermal state or a thermal state transition of a substance contained in a tank of an after-treatment system of an internal combustion engine, the thermal state being a solid phase, a liquid phase or a mixture of solid phase and liquid phase, the method comprising:

determining a current thermal state of the substance based on a tank temperature (T_tank) and a time interval during which the engine has been switched off (t_EngineOff) when an internal combustion engine is switched on;

calculating a percentage of the liquid phase based on a total mass of the substance in the tank (Total_Fluid), a heat amount supplied to the tank and a heat exchange of the tank with an external environment when the thermal state of the substance is a mixture of solid phase and liquid phase; and detecting a thermal state transition based on said tank temperature (T_tank), a time derivative of said tank temperature and said percentage of the liquid phase.

2. The method according to claim 1, wherein determining a current thermal state of the substance is based on a comparison of the tank temperature (T_tank) and a fusion temperature (T_fusion), wherein the current thermal state is determined to be a solid phase when the tank temperature is less than the fusion temperature.

3. The method according to claim 1, wherein determining a current thermal state of the substance is based on the tank temperature (T_tank), the fusion temperature (T_fusion) and the time during which the engine has been switched off (t_EngineOff), wherein the current thermal state is determined to be a mixture of solid phase and liquid phase when the tank temperature (T_tank) is equal to the fusion temperature (T_fusion) and the time during which the engine has been switched off (t_EngineOff) is smaller than a time threshold (t1).

4. The method according to claim 3, wherein determining a current state of a substances is based on the time during which the engine has been switched off (t_EngineOff) and a time threshold ($t_1$), the current thermal state of is determined to be a liquid phase when the time during which the engine has been switched off (t_EngineOff) is larger than the time threshold ($t_1$).

5. The method according to claim 1, wherein when the current thermal state is a mixture of solid phase and liquid phase, the percentage of the liquid phase is calculated by: (i) summing the amount of heat supplied to the tank due to a heat exchange of the tank with the external environment, and the amount of heat supplied to the tank by means of a heating element to compute a sum; (ii) dividing said sum by a specific latent heat (Latent_specific) of said substance to compute a result; (iii) time integrating the result to compute an integral; and (iv) dividing said integral by a total mass of the substance in the tank (Total_Fluid) to compute the percentage of the liquid phase.

6. The method according to claim 5, wherein an initial percentage of the liquid phase (Fluid_mass_thawed_init) when the internal combustion engine is switched on is determined by multiplying a prior percentage of the liquid phase (Fluid_mass_thawed_old) by a coefficient (K_EngOffCorr), wherein the coefficient is function of the time interval during which the engine is switched off (t_EngineOff) and the tank temperature (T_Tank).

7. The method according to claim 1, wherein a thermal state transition from the solid phase to a mixture of solid phase and liquid phase is identified when the tank temperature is equal to said temperature threshold (T_fusion) and a time derivative of the tank temperature is equal to zero.

8. The method according to claim 1, wherein a thermal state transition from a mixture of solid phase and liquid phase to a liquid phase is identified when the percentage of the liquid phase is higher than a first percentage threshold (totally_thawed threshold) of the liquid phase.

9. The method according to claim 1, wherein a thermal state transition from a liquid phase to a mixture of solid phase and liquid phase is identified when the percentage of the liquid phase is lower than a second percentage threshold (partially_thawed threshold) of the liquid phase.

10. The method according to claim 1, wherein a thermal state transition from a mixture of solid phase and liquid phase to a solid phase is identified when the tank temperature is lower than said temperature threshold (T_fusion).

11. The method according to claim 1 wherein the method is carried out by a computer program on an electronic control unit for an engine of an automotive system having a selective catalytic reduction system including a particulate filter.

12. The method according to claim 1 further comprising a computer program stored on a non-transitory computer readable medium having a computer-code suitable for performing the method.

* * * * *